Oct. 8, 1968  R. D. SMITH  3,404,917
MOUNTING BRACKET FOR AUTOMOBILE BABY SEAT
Filed June 28, 1966  2 Sheets-Sheet 1
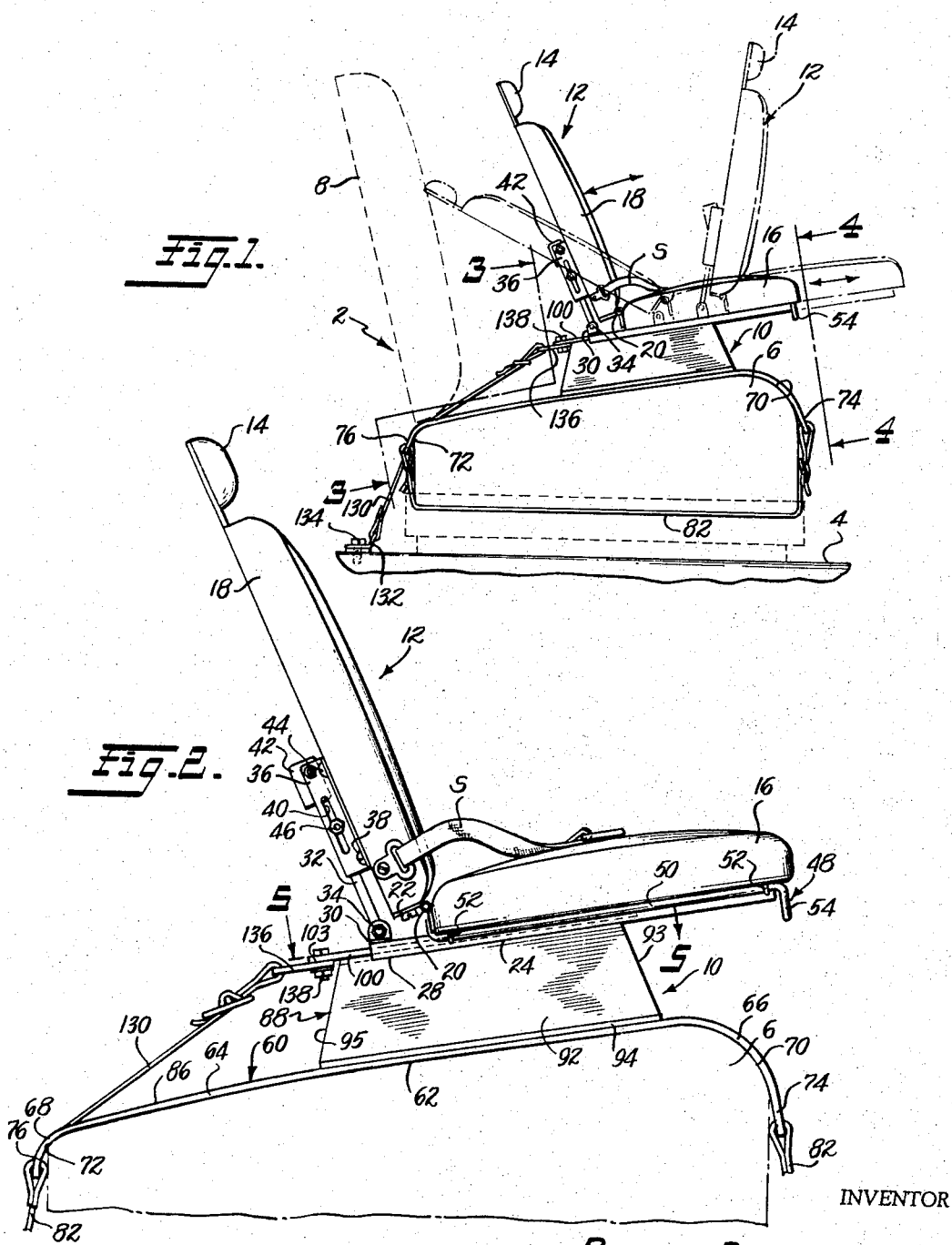
INVENTOR
RICHARD DONALD SMITH
BY Bacon & Thomas
ATTORNEYS

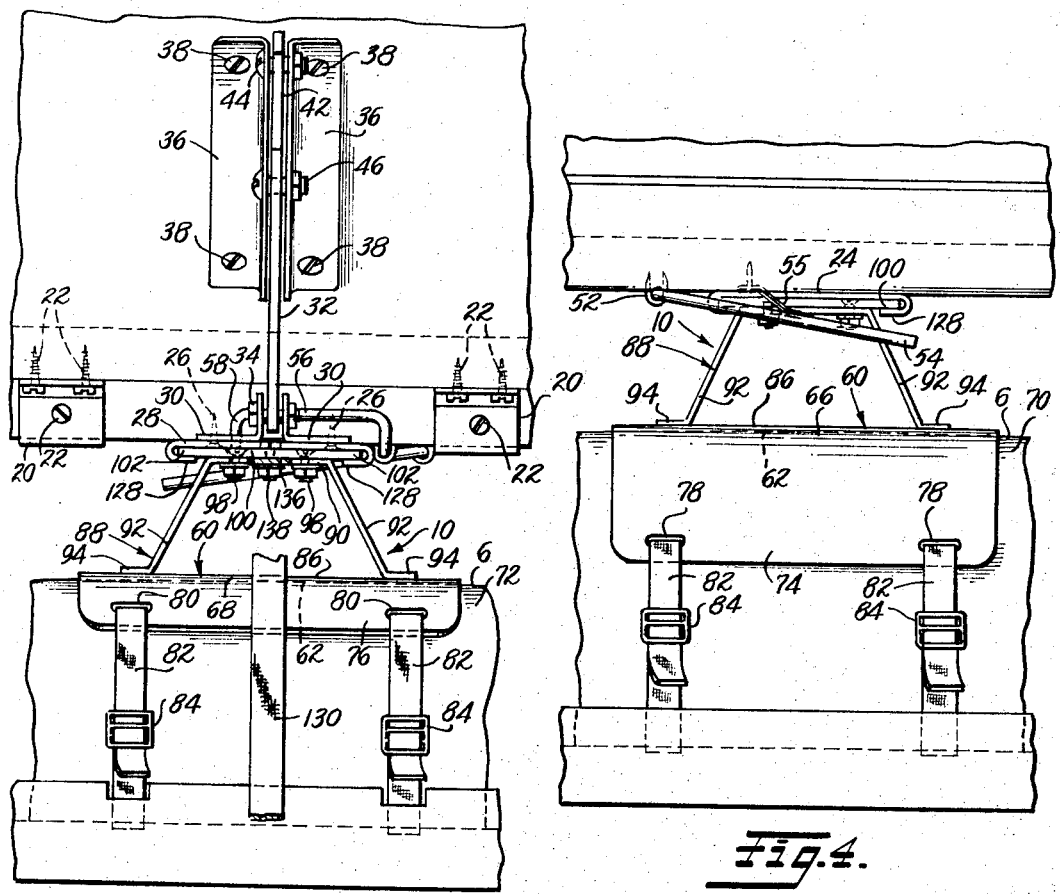
Fig.3.
Fig.4.
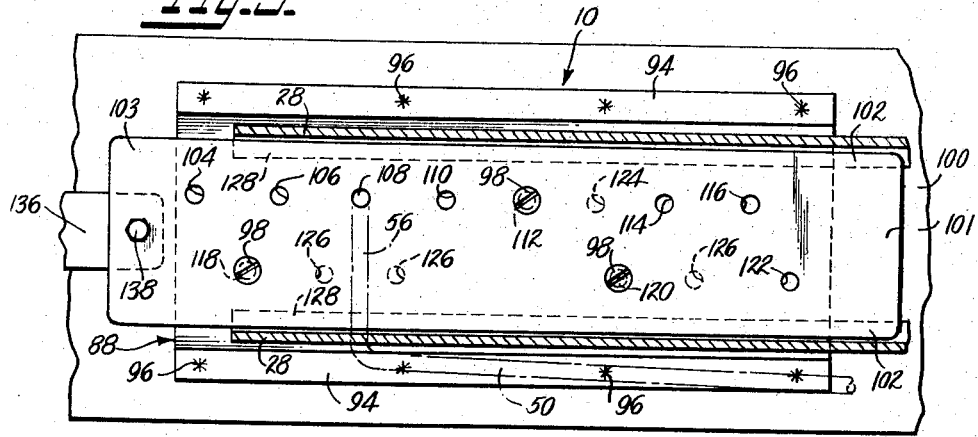
Fig.5.
INVENTOR
RICHARD DONALD SMITH
BY Bacon & Thomas
ATTORNEYS

United States Patent Office 3,404,917
Patented Oct. 8, 1968

3,404,917
MOUNTING BRACKET FOR AUTOMOBILE
BABY SEAT
Richard Donald Smith, McAllen, Tex., assignor to Reynolds Research & Manufacturing Corp., McAllen, Tex.
Filed June 28, 1966, Ser. No. 561,145
6 Claims. (Cl. 297—250)

ABSTRACT OF THE DISCLOSURE

A bracket for mounting a baby seat on the bench portion of the passenger seat of a vehicle, including a base plate with an undersurface shaped to conform to the transverse contour of the bench seat portion. The front and rear end portions of the base plate are downturned to prevent the plate from sliding forwardly and rearwardly, and each of said downturned end portions has a pair of spaced slots therein for receiving securing straps that are passed beneath the bench seat portion. An upright standard is secured to the base plate, and has means on its upper end for slidably receiving a baby seat.

---

This invention relates generally to baby seat structures for use in a passenger vehicle, and more particularly to a bracket for mounting a baby seat on the bench portion of the passenger seat of a motor vehicle.

In my prior U.S. Patent 3,193,326 there is illustrated and described a baby seat adapted to be detachably mounted upon a rail positioned between bucket type passenger seats of an automobile, and which includes a back rest portion that can be swung forwardly when desired, and which can be disposed in a selected rearwardly inclined position. The detachable mounting bracket of the present invention is intended primarily for use with my prior baby seat for mounting it on the bench portion of either the front or the rear passenger seat of the automobile, but can be utilized elsewhere and with other types of baby seat structures, and also to mount other accessories such as arm rests, trays and the like in any passenger vehicle.

It is the principal object of the present invention to provide a mounting bracket arrangement that can be detachably secured in a stable position on the bench portion of the passenger seat of a vehicle, and upon which a baby seat, or other accessory, can be removably mounted.

Another object is to provide a detachable bracket arrangement for mounting a baby seat on the bench portion of a passenger seat, including a base plate contoured to rest on said bench seat portion and to resist both forward and rearward sliding movement.

Still another object is to provide a baby seat mounting bracket arrangement that can be easily secured to and removed from the bench portion of a passenger seat, and which when installed will remain in a substantially fixed position.

A further object is to provide a detachable baby seat mounting bracket incorporating an anchor strap arrangement to positively secure the bracket against forward sliding movement during sudden deceleration of the vehicle in which it is installed.

Still another object is to provide a detachable baby seat mounting bracket which is economical to construct, and which can also be utilized to support an arm rest, a tray or other object when a baby seat is not mounted thereon.

Yet another object is to provide a baby seat structure and mounting bracket therefor adapted to be detachably secured to the bench portion of the passenger seat of a passenger vehicle, including a baby seat which can be disposed in any one of a plurality of selected positions upon said bracket, or removed therefrom and easily replaced by an arm rest, tray, etc.

Other objects and many of the attendant advantages of the invention will become readily apparent from the following detailed description, when taken in connection with the accompanying drawings, wherein:

FIG. 1 is a side elevational view of an automobile passenger seat with the detachable mounting bracket of the invention installed on the bench portion thereof, the mounting bracket having a baby seat mounted thereon shown in full lines in one position and shown in dot-and-dash lines in alternative positions;

FIG. 2 is an enlarged side elevational view similar to FIG. 1;

FIG. 3 is an enlarged, fragmentary rear view taken generally along the line 3—3 in FIG. 1, showing the rear end of the mounting bracket and the structure on the rear of the baby seat for supporting the back rest portion thereof;

FIG. 4 is an enlarged, fragmentary front view taken along the line 4—4 in FIG. 1, showing the front of the mounting bracket; and FIG. 5 is an enlarged horizontal sectional view taken along the line 5—5 in FIG. 2, showing the arrangement for locking the baby seat in position on the rail secured to the upper end of the detachable bracket.

Referring now to the drawings, an automobile passenger seat is indicated at 2 secured to the floor 4 of the passenger compartment of the automobile, and includes a bench portion 6 and a back rest 8. The back rest 8 can either be fixed in position, or it can be pivotally mounted so that it can be swung forwardly over the bench portion 6.

Secured to the bench portion 6 of the seat 2 is a mounting bracket 10 upon which is removably mounted a baby seat 12. The baby seat 12 is identical in construction to that which is the subject of my U.S. Patent 3,193,326, except that it additionally includes a head rest 14.

Briefly, the baby seat 12 includes a seat base 16 and a back rest 18, the latter being pivotaly secured at its lower end by hinges 20 to the rear end of the base 16, the hinges 20 being fastened in position by screws 22. A slide member or shoe 24 is secured centrally to the lower surface of the base 16 by screws 26 to extend longitudinally thereof, and includes a rearwardly projecting portion 28 that extends beyond the rear edge of the base 16 and upon which a pair of spaced angle brackets 30 is secured.

The lower end of a slide bar 32 is received between the upstanding flanges of the brackets 30, and is pivotally secured thereto by a bolt 34. A pair of vertically disposed angle members 36 is secured by screws 38 to the rear surface of the back rest 8 directly above the brackets 30, the central portions of the upstanding flanges of the angle member 36 having confronting, longitudinally extending slots 40 therein. A generally rectangular stop member 42 is received between the upper ends of the upstanding flanges of the angle members 36, and the upper corner thereof is pivotally secured to said flanges by a bolt 44. The upper end of the slide bar 32 is slidably received between the upstanding flanges of the angle member 36, and is secured thereto by a bolt 46 slidably mounted in the slots 40.

The lower surface of the base 16 has a locking member 48 secured thereto, which includes a longitudinally extending portion 50 fastened to the base 16 by spaced staples 52. The forward end of the locking member 48 includes an actuator arm or handle 54 which extends transversely across the front of the slide member 24, and the rear end of said locking member includes a transverse arm 56 having the shape of an inverted U, and which extends upwardly and over the rearwardly projecting portion 28 of the slide member 24 at the rear edge of the seat base 16. The transverse arm portion 56 terminates in a vertical locking tip 58, which is receivable through an aligned bore in the slide member 24.

The arm or handle portion 54 of the member 48 is downwardly inclined from the bottom surface of the seat base 16 when the locking tip 58 is received through its aligned bore in the member 24.

A spring 55 is secured between the under surface of the base 16 and the actuator arm or handle 54, and functions to resiliently hold the arm in its downwardly inclined position wherein the lower end of the locking tip 58 will extend downwardly through its aligned bore in the member 24, and will project from the lower surface of said slide member 24 to be engageable with a hole in a mating rail to lock the baby seat in position on said rail. The projecting locking tip 58 can be retracted by merely depressing the handle or arm 54, which will be returned to its downwardly inclined position by the spring 55 when it is released.

The baby seat 12, which is more fully described in my prior patent, supra, also includes a soft safety strap S that functions as a seat belt to hold a child in position. The manner in which the supporting structure for the back rest 18 functions is fully described in my prior patent, and hence will not be repeated here.

The mounting bracket 10 includes a base plate 60 made from glass fiber, plastic, metal or some other suitable semi-rigid material. The base plate 60 is designed to be placed on the bench portion 6 of the automobile passenger seat 2, to extend transversely of the longitudinal axis thereof, and the under surface 62 thereof is shaped to conform to the transverse contour of said bench portion 6. Specifically, the base plate 60 is of substantially uniform thickness and includes a generally planar central portion 64 terminating at its forward extremity in an arcuate down-turned end portion 66, and the rear end of the base plate 60 terminating in a similar arcuate down-turned end portion 68. The end portions 66 and 68 extend downwardly sufficiently to engage and overlie the front and rear edges 70 and 72, respectively, of the bench seat portion 6, whereby to prevent both forward and rearward sliding movements of the base plate 60 while such is resting on the bench seat portion. The front and rear lower edge portions 74 and 76, respectively, of the base plate 60 are spaced somewhat from the adjacent surfaces of the bench seat portion 6, and have pairs of aligned, spaced slots 78 and 80 therein, respectively, each front slot 78 being aligned with one of the rear slots 80. The base plate 60 is secured to the seat 6 by a pair of straps 82, the ends of each strap being passed through one of the front slots 78 and its corresponding rear slot 80, and being secured by buckles 84. The straps 82 pass beneath the seat 6, and when the ends thereof are tightened by the buckles 84, the base plate 60 will be firmly secured in position against forward, rearward or lateral shifting on the bench seat portion.

Secured to the top planar surface 86 of the base plate 60, just rearwardly of the front arcuate end portion 66 thereof, is a standard 88, upon which the baby seat 12 is mounted. The standard 88 can be made from sheet metal, and includes a central rectangular portion 90 from the opposite lateral edges of which a pair of diverging legs 92 extend downwardly, the legs 92 each terminating at its lower end in an outwardly directed flange 94 that is secured to the base plate 60 by spot welds 96, rivets, or other suitable fastener means. Secured to the central portion 90 by bolts 98 is a longitudinally extending rectangular plate or rail 100, the lateral edge portions 102 of which extend outwardly from the lateral edges of the central portion 90, and the front and rear ends 101 and 103 of which project beyond the ends of said central portion. The front and read edges 93 and 95 of the legs 92 diverge outwardly sufficiently so that the flanges 94 are of about the same length as the rail 100, and the width of said rail is about equal to the distance measured between the lower ends of said legs.

Referring to FIG. 5, the rail 100 has two parallel rows of axially spaced openings therethrough, the first row including a first set of five equally spaced openings 104, 106, 108, 110 and 112, and a second set of two openings 114 and 116 spaced apart the same distance as the openings of the first set, the openings 112 and 114 being spaced apart twice as far as the openings 114 and 116. The second row of openings includes three openings 118, 120 and 122. The opening 118 is disposed between the openings 104 and 106, and the openings 120 and 122 are spaced rearwardly and forwardly, respectively, from the openings 114 and 116 a distance equal to the spacing between said openings 114 and 116.

The central portion 90 of the standard 88 also has two parallel rows of openings therethrough, the first row comprising seven equally spaced openings 124 alignable with the openings 104–116, and the second row comprising two sets of three equally spaced openings 126 alignable with the openings 118, 120 and 122. The various openings in the rail 100 and the standard portion 90 make it possible to mount the rail in several different positions along the length of the portion 90, to accommodate various use situations. After the rail is properly located three bolts 98 are utilized to secure it in position, two of these being passed through aligned openings 118 and 120 in the second row of openings, and the third through one of the sets of aligned openings in the first row. The remaining openings in the first row are utilized to receive the locking tip 58 of the locking member 48 on the baby seat 12.

The slide member or shoe 24 of the baby seat 12 is slidably receivable on the rail 100, and includes inturned flanges 128, which engage beneath the lateral edge portions 102 of the rail. Before the baby seat 12 is installed on the rail 100 the handle or actuator arm 54 is depressed against the spring 55 to lift the locking tip 58. The baby seat is then mounted by inserting the rail 100 into the shoe 24, and then sliding the baby seat along the rail to the desired position. The handle 54 is then released, and the locking tip 58 is moved downwardly by spring 55 and enters one of the openings 104–116 and the aligned opening in the central portion 90 of the standard 88 to rigidly lock the baby seat in position.

As is shown by the full and dot-and-dash lines in FIG. 1, the baby seat 12 can be moved to different positions along the rail 100 to allow for adjustment of the back rest 18, or in the instance where the passenger seat back rest 8 is pivotally mounted, to allow forward swinging thereof. In any of its positions along the rail 100, the baby seat 12 can be secured by the locking tip 58 in cooperation with the openings 104–116 in the rail, and the openings 124 in the central standard portion 90.

To further insure that the baby seat structure when mounted on the bench seat portion 6 will not shift forwardly during braking or sudden deceleration of the automobile, a safety strap 130 is provided. The lower, rear end of the strap 130 is secured to an anchor 132 fastened by a bolt 134 to the floor 4 of the automobile passenger compartment. Conveniently, the anchor 132 can be one of the anchors usually employed to anchor one end of an automobile safety seat belt; or if desired, a separate anchor 132 can be employed.

The upper end of an anchor bracket 136 is secured to the rear end portion 103 of the rail 100 by a bolt 138, and the upper end of the strap 130 is secured to said anchor bracket. Thus, the strap 130 functions to positively prevent any forward sliding of the mounting bracket 10, and cooperates with the down-turned front and rear portions 66 and 68 of the base plate 60 and the straps 82 to firmly secure the base plate 60 to the bench seat portion 6.

When the baby seat structure 12 is not in use, it can be removed from the rail 100. Thereafter, if desired, suitably designed arm rests, trays, and the like (not shown), incorporating a shoe member corresponding to the member 24, can be mounted upon the rail 100. The bracket assembly 10 can be easily installed on either the front or the rear passenger seat of an automobile, and a plurality thereof can be installed in side-by-side relationship to accommodate several baby seats, if desired.

Obviously, many modifications and variations of the present invention are possible in the light of the above teachings. It is, therefore, to be understood that within the scope of the appended claims the invention may be practiced otherwise than as specifically shown and described.

I claim:

1. A detachable bracket for mounting a baby seat on the bench portion of the passenger seat of a vehicle, comprising: a base plate designed to rest upon said bench seat portion, the undersurface of said base plate conforming generally to the transverse contour of the top, front and rear of said bench seat portion, and the front and rear end portions of the base plate being downturned to engage over the front and rear edges of said bench seat portion to prevent forward or rearward sliding of said base plate, the downturned front and rear edges of said base plate each having a pair of spaced slots therein; strap means engaged with said base plate, and adapted to be passed beneath said bench seat portion to secure said base plate thereto, said strap means including a pair of straps, each strap being engaged with one of the slots on the downturned rear edge and a corresponding slot on the downturned front edge of the base plate; an upright standard secured at its lower end upon the upper surface of said base plate; and a mounting element secured to the upper end of said standard to extend longitudinally of said base plate, said mounting element being designed to slidably receive a mating element secured to the undersurface of a baby seat or other device to be installed upon said bracket.

2. A detachable bracket as recited in claim 1, wherein the standard comprises a central portion, and downwardly and outwardly diverging legs extending from said central portion, each leg having a flange secured to the base plate.

3. A detachable bracket as recited in claim 1, including an anchor strap to be connected between a portion of the vehicle structure and the rear end of the mounting element secured to the upper end of the standard.

4. A baby seat structure to be detachably mounted upon the bench portion of the passenger seat of a vehicle, comprising: a baby seat including a seat base portion having a longitudinally extending slide member secured to the undersurface thereof; a bracket having a base plate to rest upon said bench portion of said passenger seat, the undersurface of said base plate conforming generally to the transverse contour of the top, front and rear of said bench seat portion, and the front and rear end portions of the base plate being downturned to engage over the front and rear edges of said bench seat portion to prevent forward or rearward sliding of said base plate, the downturned front and rear edges of said base plate each having a pair of spaced slots therein; strap means engaged with said base plate, and to be passed beneath said bench seat portion to secure said base plate thereto, said strap means including a pair of straps, each strap being engaged with one of the slots on the downturned rear edge and a corresponding slot on the downturned front edge of the base plate; an upright standard secured at its lower end to the upper surface of said base plate; and a rail secured to the upper end of said standard to extend longitudinally of said base plate, said slide member on said baby seat being slidably receivable on said rail; and means for securing said baby seat in preselected positions along the length of said rail.

5. A baby seat structure as recited in claim 4, wherein said rail has a plurality of longitudinally spaced openings therethrough, and wherein said securing means comprises an element carried by said baby seat and operable to engage with a selected one of said spaced openings.

6. A baby seat structure as recited in claim 4, including additionally an anchor strap secured to the rear end of said rail, and adapted to be secured to the vehicle structure behind the passenger seat.

References Cited

UNITED STATES PATENTS

| | | | |
|---|---|---|---|
| 687,482 | 11/1901 | Lenderson | 297—232 |
| 1,429,867 | 9/1922 | Goldsmith | 297—250 |
| 2,086,244 | 7/1937 | Smith | 297—414 |
| 2,308,315 | 1/1943 | Smith | 297—250 |
| 2,650,654 | 9/1953 | Twiford | 297—253 |
| 2,726,710 | 12/1955 | Cutler | 297—194 |
| 2,667,913 | 2/1954 | Dustin | 297—463 |
| 2,777,502 | 1/1957 | Travis | 297—250 |
| 2,797,739 | 7/1957 | Orsini | 297—194 |
| 3,167,790 | 2/1965 | Hickey | 297—252 |
| 3,193,326 | 7/1965 | Smith | 297—257 |

FRANCIS K. ZUGEL, *Primary Examiner.*